March 24, 1970 J. G. PECIS Re. 26,838

COLOR INDICATOR FOR PUSH-PULL FAUCET

Original Filed Feb. 25, 1964

United States Patent Office

Re. 26,838
Reissued Mar. 24, 1970

26,838

COLOR INDICATOR FOR PUSH-PULL FAUCET

John G. Pecis, Wilmington, Del., assignor to Speakman Company, Wilmington, Del.

Original No. 3,238,968, dated Mar. 8, 1966, Ser. No. 347,269, Feb. 25, 1964. Application for reissue July 3, 1967, Ser. No. 661,138
Int. Cl. F16k *11/02, 37/00*
U.S. Cl. 137—556 5 Claims

Matter enclosed in heavy brackets [ ] appears in the original patent but forms no part of this reissue specification; matter printed in italics indicates the additions made by reissue.

*ABSTRACT OF THE DISCLOSURE*

*A non-rotating color plate with contrasting colors to indicate hot and cold water outlet temperatures underlying the handle of a push-pull faucet. That portion of the color plate which is viewable through a window in the handle corresponds to the water outlet temperature selected by rotation of the handle.*

This invention relates to a faucet handle indicating the temperature of the water delivered to the faucet, and a method for indicating the temperature of the water.

Heretofore faucets delivered water to a receptacle were usually of the two faucets type, the one delivering hot water and the other delivering cold water, each controlled by a separate valve. The temperature of the water in the receptacle was regulated by varying the amount of hot water and cold water introduced into the receptacle. The next development was the use of a mixing chamber between the valves and the water from this chamber was delivered to the receptacle from a single faucet. The adjustment of each valve individually produced the temperature desired in the mixed water. The last development is the use of a single faucet and a single valve element to produce mixed water of a desired temperature. In order to indicate the control necessary on valves of this type there has heretofore been printed on the valve in a conspicuous place the direction in which the valve must be rotated in order to obtain more or less hot water. This has not proven satisfactory because a number of users are not able to read clearly.

It is an object of the present invention to clearly indicate by means of a color change the position of the valve necessary to produce hot and cold water in a single handle faucet.

It is a further object of this invention to permit, by means of the color change, the amount of cold and the amount of hot water delivered by the faucet when it is delivering a mixture of both.

These and other objects will be apparent from the following drawings and descriptive matter given for purposes of example only and not as a limitation of the invention. In the drawings.

Figure 1:
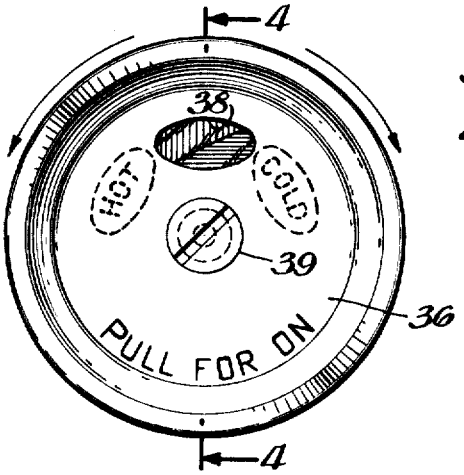
FIGURE 1 is a top plan view of the control knob for a single handle faucet.
Figure 4:
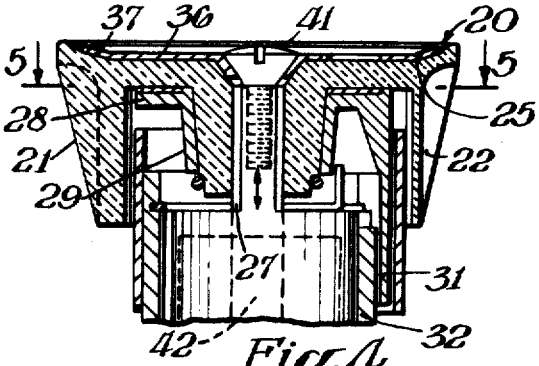
FIGURE 4 is a sectional view on the line 4—4 of FIGURE 1.
Figure 2:
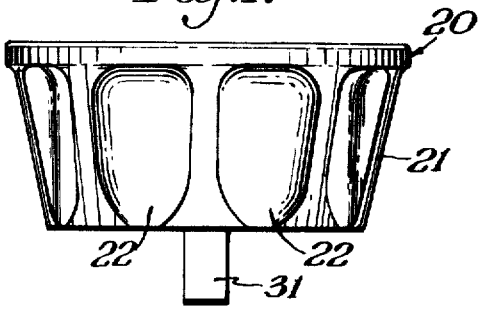
FIGURE 2 is a side view of the handle shown in FIGURE 1.
Figure 5:
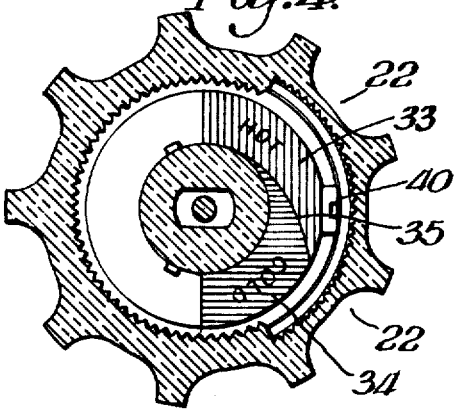
FIGURE 5 is a sectional view on the line 5—5 of FIGURE 4.
Figure 3:
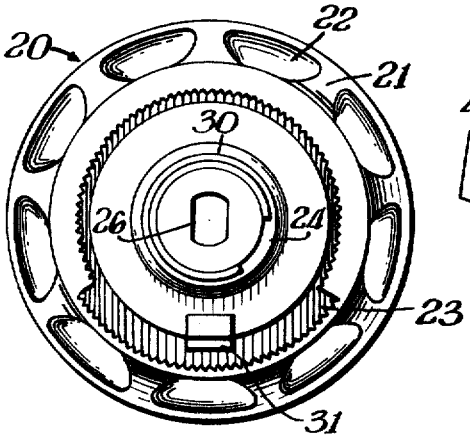
FIGURE 3 is a bottom plan view of the handle shown in FIGURE 1.
Figure 6:
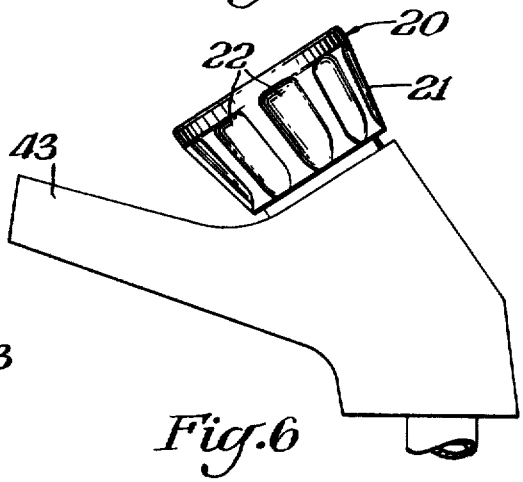
FIGURE 6 is a profile plan view showing the handle assembly with a faucet.

The faucet illustrated in FIGURES 1 to 6 and the control valve associated therewith is of the push-pull type, that is, the water is in the off position when the handle is pushed in to the position shown in FIGURE 6. In order to turn the faucet on, the handle is pulled away from the faucet housing. In order to increase the hot water it is rotated in a counter-clockwise direction and in order to increase the cold water the rotation is reversed.

The faucet handle assembly 20 comprises a body portion 21, generally circular in configuration, and having finger gripping recesses 22, 22 in the sides thereof. This body portion, for the purpose of illustration, is made of transparent plastic and has an interior recessed portion 23 arcuately cut away on one side thereof. This portion is cut away in an arc equal to a full extent to which the handle may be rotated, from extreme cold or extreme hot. An interior boss 24, on the under side of the upper surface 25 of the body portion protrudes downwardly and has an opening 26 therein to receive the valve stem 27. A color plate 28 is provided in the interior of the body portion and has the skirt portion 29 which surrounds the boss 24 on the under side of the body portion. This color plate is held in rotating engagement with the boss and is retained in position by means of snap ring 30. The color plate has a depending arm 31, which is received in and held stationary by an opening 40 in the valve body 32. The upper portion of the color plate 28 has its surface abraded and stained, red as indicated at 33 on one side and the blue, as indicated at 34, on the other side. The junction of these two colors forms an arc 35 across the surface of this plate. For the purpose of illustration this plate is made from a high tensile strength polymer, such as nylon.

An opaque plate 36 fits within the recess 37 on the upper surface of the body portion of the handle assembly. This opaque plate has a window 38 therein and has a central opening 39.

In placing these parts in operating assembly the color plate is placed over the boss 24 and held in position by means of the snap ring 30 so that it is free to rotate about the boss for the amount of rotation being limited by the cut-away portion 23 on the interior surface of the body portion. The depending arm 31 fits within a slot 40 in the valve body 32. The [color] *opaque* plate 36 is then placed within the recess 37 and secured in position by means of the machine bolt 41 which passes from the opaque plate into the valve stem 42 and holds the valve stem within the flattened opening 26. When the handle assembly 20 is in the position shown in FIG. 6 the valve is in the off position and no water flows from the faucet 43. But when the handle is pulled outwardly or reciprocated away from the faucet 43 the water commences to flow and the farther out the handle is pulled the greater the flow of water. In order to vary the temperature of the water the handle is rotated clockwise for cold water which shows a blue color through the window 38, and then on rotation counterclockwise to the position shown in FIGURE 1, an equal volume of hot and cold water is admitted to the faucet and the color changes through the window 38 from blue to half red. Upon further rotation in a counterclockwise manner all hot water is admitted to the faucet and the color seen through the window changes to all red.

Due to the fact that the junction of the red and blue field on the color is arcuate in form the red will just begin to appear when the hot water valve just begins to open, and the blue color will disappear when the cold water valve just closes.

This permits a visual indication of the amount of hot and cold water being discharged from the faucet and does not require close examination to read the directions on the cover plate. People with poor eyesight and children who cannot read are therefore able to determine by casual visual examination through the window 38 the amount of hot and cold water admitted to the faucet.

While in the above preferred embodiment of this invention a transparent handle has been disclosed, which has a metal plate having an oval opening therein, this opening does not have to be oval and the handle can be made of metal and have an opening therethrough. Both of these modifications are part of the present invention.

While the above description and drawings are for the purposes of illustration and are applied to a faucet or a wash basin or a kitchen sink, the same principle may be applied to shower valves. This has the advantage of allowing the user to stand on one side of the shower and adjust the water to the desired temperature and then enter the shower with confidence.

The above description is given for the purposes of example only so as to describe the invention, the invention is not limited by this description or by the example and is only limited by the claims attached hereto.

What is claimed is:

1. In a single handle valve fitting, having a valve body and a valve stem, which upon rotational movement controls the temperature of the water and which upon reciprocal movement controls the volume of the water, in combination therewith:

(a) a handle attached to and controlling the rotational and reciprocal movement of said valve stem;

(b) a color plate concentric with said valve stem, said color plate having a portion thereof colored to indicate cold water and the adjoining portion contrastingly colored to indicate hot water, [means whereby the color plate reciprocates with the handle,]

(c) an opaque plate mounted above the color plate, said opaque plate having an opening therein overlying said colored portion of said color plate, and (d) means whereby the color plate and the opaque plate rotate with respect to each other upon rotation of said handle.

2. In a single handle valve fitting, having a valve body and a valve stem, which upon rotational movement controls the temperature of the water, and which upon reciprocal movement controls the volume of the water, in combination therewith:

(a) a transparent handle attached to and controlling the rotational and reciprocal movement of said valve stem, (b) a color plate concentric with said valve stem, retaining in non-rotating position with relation to said valve body, said color plate having a portion thereof colored to indicate cold water and the adjoining portion thereof contrastingly colored to indicate hot water, [means whereby the color plate reciprocates with the handle] and (c) an opaque plate mounted above the color plate and rotatable with the handle, said opaque plate having an opening therein overlying said colored portion of said color plate.

3. In a single handle valve fitting, having a valve body and a valve stem, which upon rotational movement controls the temperature of the water, and which upon reciprocal movement controls the volume of the water, in combination therewith:

(a) a transparent handle attached to and controlling the rotational and reciprocal movement of said valve stem, (b) a color plate concentric with said valve stem, retained in non-rotating position with relation to said valve body, said color plate having a portion thereof colored to indicate cold water and the adjoining portion contrastingly colored to indicate hot water, the junction of the said two colored portions forming an arc across the surface of said color plate, means whereby the color plate reciprocates with the handle, and (c) an opaque plate mounted above the color plate and rotatable with the handle, said opaque plate having an opening therein overlying said colored portion of said color plate.

4. In a single handle valve fitting, having a valve body and a valve stem, which upon rotational movement controls the temperature of the water, and which upon reciprocal movement controls the volume of the water, in combination therewith:

(a) a transparent handle attached to and controlling the rotational and reciprocal movement of said valve stem, (b) a color plate concentric with said valve stem, retained in non-rotating position with relation to said valve body, said color plate having a portion thereof colored blue to indicate cold water and the adjoining portion colored red to indicate hot water, the junction of the said two colored portions forming an arc across the surface of said color plate, means whereby the color plate reciprocates with the handle, and, (c) an opaque plate mounted above the color plate and rotatable with the handle, said opaque plate having an opening therein overlying the colored portion of said color plate.

*5. In a single handle valve fitting having a valve body and a valve stem which upon rotational movement controls the temperature of the discharge water and which upon reciprocal movement controls the volume of the discharge water, in combination therewith:*

*(a) a handle assembly connected to control the rotational and reciprocal movement of said valve stem;*

*(b) a window in said handle assembly;*

*(c) a color plate arranged beneath said window in said handle assembly having adjoining contrasting colored portions thereon to indicate hot and cold water; and,*

*(d) means in the handle assembly connected to cause different colored portions of said color plate to be visible through said window as said valve stem is rotated.*

References Cited

The following references, cited by the Examiner, are of record in the patented file of this patent or the original patent.

UNITED STATES PATENTS

| | | | |
|---|---|---|---|
| D. 189,712 | 1/1961 | Chapman | D91—3 |
| 828,434 | 8/1906 | Stahl | 116—125 |
| 2,485,942 | 10/1949 | Turner | 116—125 |
| 3,155,115 | 11/1964 | Zeigler | 137—636.4 |
| 3,254,669 | 6/1966 | Perlman | 116—125 XR |
| 412,644 | 10/1889 | Meyer. | |
| 2,617,381 | 11/1952 | Insul. | |

FOREIGN PATENTS

| | | |
|---|---|---|
| 156,608 | 2/1922 | Great Britain. |
| 452,596 | 8/1936 | Great Britain. |

HENRY T. KLINKSIEK, Primary Examiner

U.S. Cl. X.R.

137—636.4; 116—125; D23—28, 39